United States Patent
Hu et al.

(10) Patent No.: US 12,177,419 B2
(45) Date of Patent: Dec. 24, 2024

(54) METHOD AND APPARATUS FOR CONSTRUCTING MOTION INFORMATION LIST IN VIDEO ENCODING AND DECODING AND DEVICE

(71) Applicant: Tencent Technology (Shenzhen) Company Limited, Shenzhen (CN)

(72) Inventors: Ye Hu, Shenzhen (CN); Xiaozhong Xu, Shenzhen (CN); Yingbin Wang, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 17/896,930

(22) Filed: Aug. 26, 2022

(65) Prior Publication Data

US 2022/0408084 A1 Dec. 22, 2022

Related U.S. Application Data

(63) Continuation of application No. PCT/CN2021/112092, filed on Aug. 11, 2021.

(30) Foreign Application Priority Data

Aug. 20, 2020 (CN) .......................... 202010843772.7

(51) Int. Cl.
*H04N 19/176* (2014.01)
*H04N 19/105* (2014.01)
*H04N 19/137* (2014.01)

(52) U.S. Cl.
CPC ......... *H04N 19/105* (2014.11); *H04N 19/137* (2014.11); *H04N 19/176* (2014.11)

(58) Field of Classification Search
CPC ... H04N 19/105; H04N 19/137; H04N 19/176
(Continued)

(56) References Cited

U.S. PATENT DOCUMENTS 12,120,314 B2 * 10/2024 Zhang ................. H04N 19/176
2015/0264348 A1 * 9/2015 Zou ...................... H04N 19/593
375/240.02

(Continued)

FOREIGN PATENT DOCUMENTS

CN 106464905 A 2/2017
CN 110809161 A 2/2020
(Continued)

OTHER PUBLICATIONS

Tencent Technology, WO, PCT/CN2021/112092, Nov. 3, 2021, 4 pgs.

(Continued)

*Primary Examiner* — Albert Kir
(74) *Attorney, Agent, or Firm* — Morgan, Lewis & Bockius LLP

(57) ABSTRACT

This application provides a method and an apparatus for constructing a motion information list in video encoding and decoding and a device, which relates to the field of video encoding and decoding technologies. The method includes: constructing a space domain motion information list, the space domain motion information list including motion information of a space domain neighboring block of a current block, and the space domain neighboring block including at least an intra string copy (ISC) block; and obtaining at least one piece of motion information from the space domain motion information list when motion information in a candidate motion information list is insufficient, and filling the candidate motion information list using the at least one piece of motion information. According to this (Continued)

application, by filling the candidate motion information list using the space domain adjacent motion information when the motion information included in the candidate motion information list is insufficient, content of the candidate motion information list is expanded, so that more displacement vectors that are more effective are provided in the candidate motion information list to achieve a better displacement vector prediction effect, thereby improving the video compression performance.

19 Claims, 5 Drawing Sheets

(58) Field of Classification Search
USPC .................................................. 375/240.12
See application file for complete search history.

(56) References Cited

U.S. PATENT DOCUMENTS

| | | | | |
|---|---|---|---|---|
| 2015/0350674 | A1* | 12/2015 | Laroche | H04N 19/52 |
| | | | | 375/240.16 |
| 2017/0188045 | A1 | 6/2017 | Zhou | |
| 2021/0227206 | A1* | 7/2021 | Chiu | H04N 19/70 |
| 2022/0070455 | A1* | 3/2022 | Zhang | H04N 19/635 |
| 2022/0109829 | A1* | 4/2022 | Takehara | H04N 19/139 |
| 2022/0116657 | A1* | 4/2022 | Kumakura | H04N 19/105 |
| 2022/0182638 | A1* | 6/2022 | Xu | H04N 19/1883 |
| 2023/0276044 | A1* | 8/2023 | Liu | H04N 19/105 |
| | | | | 375/240.02 |
| 2024/0348790 | A1* | 10/2024 | Nakamura | H04N 19/137 |

FOREIGN PATENT DOCUMENTS

| | | |
|---|---|---|
| CN | 110855993 A | 2/2020 |
| CN | 110868589 A | 3/2020 |
| CN | 110876065 A | 3/2020 |
| CN | 111163322 A | 5/2020 |
| GB | 2527354 A | 12/2015 |
| WO | WO 2020141954 A1 | 7/2020 |

OTHER PUBLICATIONS

Tencent Technology, IPRP, PCT/CN2021/112092, Feb. 16, 2023, 5 pgs.

Tencent Technology, Extended European Search Report, EP21857553.8, Jul. 26, 2023, 9 pgs.

Yingbin Wang et al., "Low Complexity Implementation of Intra String Copy in AVS3", 2021 IEEE International Conference on Multimedia & Expo Workshops (ICMEW), IEEE, Jul. 5, 2021, XP034121420, 4 pgs.

Tencent Technology, ISR, PCT/CN2021/112092, Nov. 3, 2021, 3 pgs.

* cited by examiner

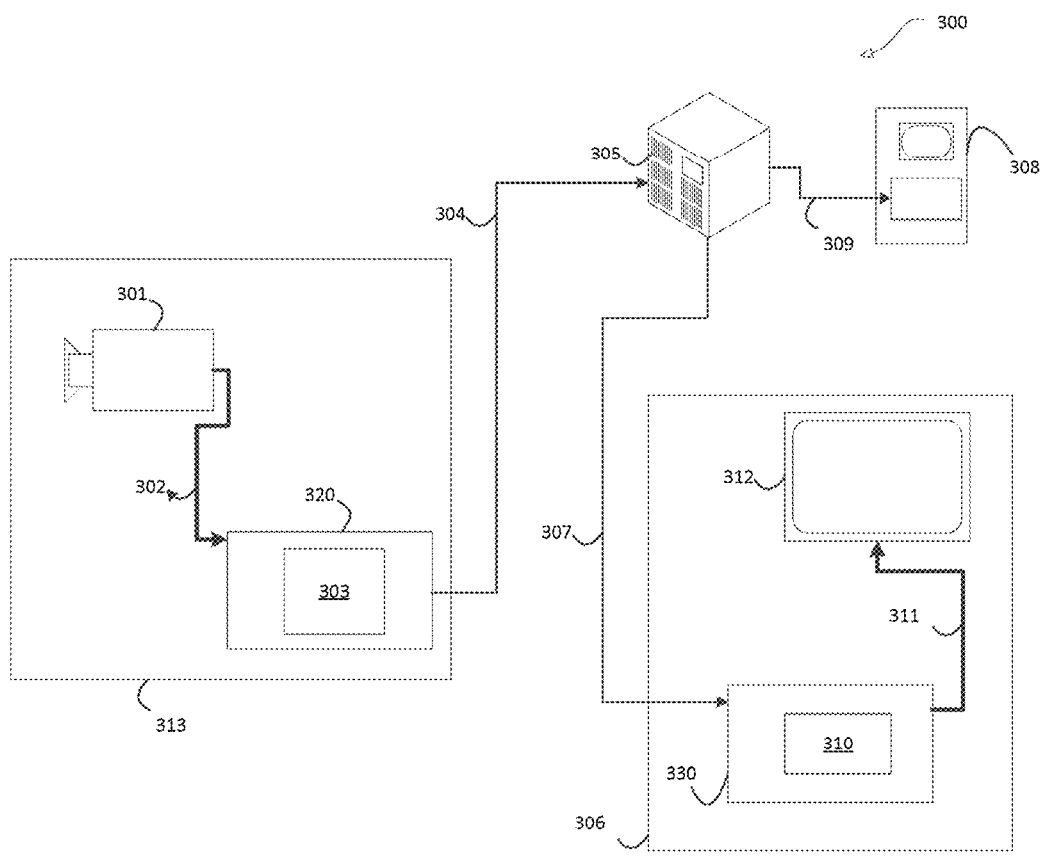

FIG. 7

801 — Construct a space domain motion information list, the space domain motion information list including motion information of a space domain neighboring block of a current encoding and decoding block, and the space domain neighboring block including at least an ISC block 802 — Obtain at least one piece of motion information from the space domain motion information list in a case that motion information in a candidate motion information list is insufficient, and fill the candidate motion information list using the at least one piece of motion information

FIG. 8

METHOD AND APPARATUS FOR CONSTRUCTING MOTION INFORMATION LIST IN VIDEO ENCODING AND DECODING AND DEVICE

CROSS-REFERENCE TO RELATED APPLICATIONS

This application is a continuation application of PCT Patent Application No. PCT/CN2021/112092, entitled "METHOD, APPARATUS AND DEVICE FOR CONSTRUCTING MOTION INFORMATION LIST IN VIDEO CODING AND DECODING" filed on Aug. 11, 2021, which claims priority to Chinese Patent Application No. 202010843772.7, filed with the State Intellectual Property Office of the People's Republic of China on Aug. 20, 2020, and entitled "METHOD AND APPARATUS FOR CONSTRUCTING MOTION INFORMATION LIST IN VIDEO ENCODING AND DECODING AND DEVICE", all of which are incorporated herein by reference in their entirety.

This application is related to U.S. application Ser. No. 17/896,937, entitled "METHOD AND APPARATUS FOR CONSTRUCTING MOTION INFORMATION LIST IN VIDEO ENCODING AND DECODING AND DEVICE" filed on Aug. 26, 2022, which is incorporated herein by reference in its entirety.

FIELD OF THE TECHNOLOGY

Embodiments of this application relate to the field of video encoding and decoding technologies, and in particular, to a method and an apparatus for constructing a motion information list in video encoding and decoding and a device.

BACKGROUND OF THE DISCLOSURE

In current video compression technologies, for example, in versatile video coding (VVC) and audio video coding standard 3 (AVS3), a video codec generally needs to construct a motion information list to export a prediction displacement vector.

However, when displacement vectors included in the motion information list are insufficient, the motion information list cannot provide an effective prediction displacement vector, which affects the video compression performance.

SUMMARY

Embodiments of this application provide a method and an apparatus for constructing a motion information list in video encoding and decoding and a device. Therefore, when motion information included in a candidate motion information list is insufficient, the candidate motion information list is filled using space domain adjacent motion information, to achieve a better displacement vector prediction effect, thereby improving the video compression performance. The technical solutions are as follows:

According to an aspect of the embodiments of this application, a method for constructing a motion information list in video encoding and decoding is provided, the method including:
  constructing a space domain motion information list for a current block, the space domain motion information list comprising motion information of a space domain neighboring block of the current block, and the space domain neighboring block comprising at least an intra string copy (ISC) block; and
  obtaining at least one piece of motion information from the space domain motion information list when motion information in a candidate motion information list of the current block is insufficient, and filling the candidate motion information list using the at least one piece of motion information,
  the candidate motion information list being used for providing a candidate prediction displacement vector for the current block.

According to an aspect of the embodiments of this application, an apparatus for constructing a motion information list in video encoding and decoding is provided, the apparatus including:
  a list constructing module, configured to construct a space domain motion information list for a current block, the space domain motion information list comprising motion information of a space domain neighboring block of the current block, and the space domain neighboring block comprising at least an intra string copy (ISC) block; and
  a list filling module, configured to obtain at least one piece of motion information from the space domain motion information list when motion information in a candidate motion information list of the current block is insufficient, and filling the candidate motion information list using the at least one piece of motion information,
  the candidate motion information list being used for providing a candidate prediction displacement vector for the current block.

According to an aspect of the embodiments of this application, a computer device is provided, including a processor and a memory, the memory storing at least one instruction, the at least one instruction being loaded and executed by the processor to implement the foregoing method for constructing a motion information list in video encoding and decoding.

According to an aspect of the embodiments of this application, a non-transitory computer-readable storage medium is provided, storing at least one instruction, the at least one instruction being loaded and executed by a processor of a computer device to cause the computer device to implement the foregoing method for constructing a motion information list in video encoding and decoding.

According to a further aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium and executes the computer instructions, to cause the computer device to execute the foregoing method for constructing a motion information list in video encoding and decoding.

The technical solutions provided in the embodiments of this application may include the following beneficial effects:
  by filling the candidate motion information list using the space domain adjacent motion information when the motion information included in the candidate motion information list is insufficient, content of the candidate motion information list is expanded, so that more displacement vectors that are more effective are provided in the candidate motion information list to achieve a better displacement vector prediction effect, thereby improving the video compression performance.

BRIEF DESCRIPTION OF THE DRAWINGS

FIG. 7 is a schematic exemplary diagram of a placement manner of a video encoder and a video decoder in a streaming transmission environment according to this application.

FIG. 8 is a flowchart of a method for constructing a motion information list in video encoding and decoding according to an embodiment of this application.

DESCRIPTION OF EMBODIMENTS

To make the objectives, technical solutions, and advantages of this application clearer, the following further describes implementations of this application in detail with reference to the accompanying drawings.

Figure 1:
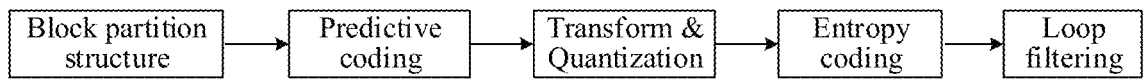
FIG. 1 is an exemplary basic flowchart of a video encoding process according to this application.

Before the embodiments of this application are described, the video encoding technology is simply introduced first with reference to FIG. 1. FIG. 1 is an exemplary basic flowchart of a video encoding process.

A video signal refers to an image sequence including a plurality of frames. A frame is a representation of spatial information of the video signal. A YUV mode is used as an example, one frame includes a brightness sample matrix (Y) and two chrominance sample matrices (Cb and Cr). From a perspective of an obtaining manner of a video signal, the obtaining manner may be divided into two manners: camera capturing and computer generation. Due to different statistical characteristics of the two manners, corresponding compression encoding manners may also be different.

In mainstream video encoding technologies, for example, in H.265/High Efficiency Video Coding (HEVC), H.266/Versatile Video Coding (VVC), and Audio Video Coding Standard (AVS, for example, AVS3), a series of operations and processing are performed on an inputted original video signal by using a hybrid coding framework as follows:

1. Block partition structure: An inputted image is partitioned into a plurality of non-overlapping processing units, and similar compression operations are performed on all the processing units. The processing unit may be referred to as a coding tree unit (CTU) or a largest coding unit (LCU). Each CTU may further continue to be partitioned more finely into one or more basic coding units, which are referred to as coding units (CUs). Each CU is the most basic element in an encoding process. Various possible encoding modes for each CU are described below.

2. Predictive coding: The predictive coding includes modes such as intra-frame prediction and inter-frame prediction. After an original video signal is predicted using a selected reconstructed video signal, a residual video signal is obtained. An encoder side needs to select a most suitable one for a current CU from many possible predictive coding modes, and informs a decoder side. The intra-frame prediction refers to that a predicted signal comes from a region in a same image that has been encoded and reconstructed. The inter-frame prediction refers to that a predicted signal comes from another image (referred to as a reference image) that has been encoded and that is different from a current image.

3. Transform & Quantization: A residual video signal is transformed into a transform domain through a transform operation such as discrete fourier transform (DFT) or discrete cosine transform (DCT), to generate a transform coefficient. A lossy quantization operation is further performed on the signal in the transform domain, which loses a specific amount of information, so that the quantized signal is conducive to compressed expression. In some video encoding standards, there may be more than one transform manner for selection. Therefore, the encoder side also needs to select one of the transform manners for the current CU and inform the decoder side. The fineness of quantization is generally determined by a quantization parameter (QP). A lager value of the QP represents that coefficients within a larger range will be quantized as a same output, and therefore, may usually bring a larger distortion and a lower bit rate. Conversely, a smaller value of the QP represents that coefficients within a smaller range will be quantized as a same output, and therefore, may usually bring a smaller distortion while corresponding to a higher bit rate.

4. Entropy coding or statistical coding: Statistical compression coding is performed on a quantized transform domain signal according to an occurrence frequency of each value, to finally output a binarized (0 or 1) compressed bitstream. In addition, other information such as a selected mode and a motion vector is generated through encoding, and entropy coding is also needed to reduce a bit rate. Statistical coding is a lossless coding mode that can effectively reduce a bit rate required for expressing a same signal. Common statistical coding modes include Variable Length Coding (VLC) or Content Adaptive Binary Arithmetic Coding (CABAC).

5. Loop filtering: A reconstructed decoded image may be obtained through operations such as inverse quantization, inverse transform, and prediction compensation (reverse operations of the foregoing 2 to 4) on an encoded image. Compared with an original image, a reconstructed image has some information different from that of the original image due to impact of quantization, resulting in a distortion. A filtering operation, for example, deblocking, sample adaptive offset (SAO) filtering, or adaptive loop filter (ALF) filtering, is performed on the reconstructed image, which can effectively reduce a degree of distortion produced by quantization. Because the filtered reconstructed image is used as a reference for subsequently encoding an image and is used for predicting a future signal, the foregoing filtering operation is also referred to as loop filtering, that is, a filtering operation in an encoding loop.

It can be learned according to the foregoing video encoding process that in the decoder side, after obtaining a compressed bitstream, for each CU, a decoder first performs entropy decoding to obtain various mode information and quantized transform coefficients. Inverse quantization and inverse transform are performed on the coefficients, to obtain a residual signal. On the other hand, a predicted signal corresponding to the CU may be obtained according to the known encoding mode information, and a reconstructed signal can be obtained by adding the residual signal and the predicted signal. Finally, a loop filtering operation needs to be performed on a reconstructed value of the decoded image before a final output signal is generated.

In some mainstream video encoding standards such as HEVC, VVC, and AVS3, a block-based hybrid coding framework is used. In the standards, original video data is divided into a series of encoded blocks, and the video data is compressed in combination with video coding methods such as predictive, transform, and entropy coding. Motion compensation is a prediction method commonly used in video encoding, and the motion compensation exports a prediction value of a current encoded block from an encoded region based on redundant characteristics of video content in a time domain or space domain. Such prediction method includes inter-frame prediction, intra block copy prediction, and intra string copy prediction. In a specific encoding implementation, the prediction methods may be used independently or in combination. For an encoded block to which the prediction methods are applied, one or more two-dimensional displacement vectors generally need to be explicitly or implicitly encoded in a bitstream, to indicate displacements of one or more reference blocks of a current block (or a collocated block of the current block).

In different prediction modes and different implementations, the displacement vector may have different names, and the displacement vector in this specification is uniformly described in the following manners: 1) a displacement vector in the inter-frame prediction mode is referred to as a motion vector (MV); 2) a displacement vector in the intra block copy (IBC) prediction mode is referred to as a block vector (BV); and 3) a displacement vector in the intra string copy (ISC) prediction mode is referred to as a string vector (SV). ISC is also referred to as "string prediction" or "string matching".

An MV is a displacement vector used for the inter-frame prediction mode. The displacement vector points from a current image to a reference image, and a value thereof is a coordinate offset between the current block and the reference block, where the current block and the reference block are in two different images. In the intra-frame prediction mode, MV prediction may be introduced, to predict an MV of the current block to obtain a prediction MV corresponding to the current block. Performing encoding transmission on a difference between the prediction MV and an actual MV corresponding to the current block helps save bit overheads when compared with directly performing encoding transmission on the actual MV corresponding to the current block. In the embodiments of this application, the prediction MV refers to a prediction value of the MV of the current block obtained through an MV prediction technology.

A BV is a displacement vector used for the IBC prediction mode, and a value thereof is a coordinate offset between the current block and the reference block, where the current block and the reference block are both in the current image. In the IBC prediction mode, BV prediction may be introduced, to predict a BV of the current block to obtain a prediction BV corresponding to the current block. Performing encoding transmission on a difference between the prediction BV and an actual BV corresponding to the current block helps save bit overheads when compared with directly performing encoding transmission on the actual BV corresponding to the current block. In the embodiments of this application, the prediction BV refers to a prediction value of the BV of the current block obtained through a BV prediction technology.

A SV is a displacement vector used for the ISC prediction mode, and a value thereof is a coordinate offset between a current string and a reference string, where the current string and the reference string are both in the current image. In the ISC prediction mode, SV prediction may be introduced, to predict an SV of the current string to obtain a prediction SV corresponding to the current string. Performing encoding transmission on a difference between the prediction SV and an actual SV corresponding to the current string helps save bit overheads when compared with directly performing encoding transmission on the actual SV corresponding to the current string. In the embodiments of this application, the prediction SV refers to a prediction value of the SV of the current string obtained through an SV prediction technology.

The different prediction modes are introduced below:

I. Inter-Frame Prediction Mode.

Figure 2:
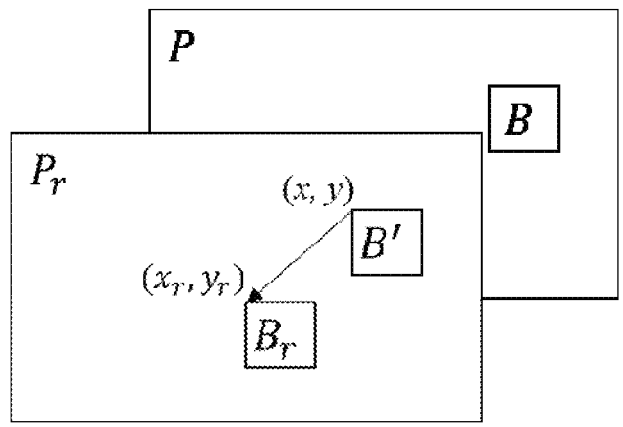
FIG. 2 is a schematic diagram of an inter-frame prediction mode according to an embodiment of this application.

As shown in FIG. 2, The inter-frame prediction is to predict a pixel of the current image by using correlation of a time domain of a video and using a pixel of an adjacent encoded image, so that the time domain redundancy of the video is effectively removed, thereby effectively saving bits for encoding residual data. P is a current frame, Pr is a reference frame, B is a current to-be-encoded block, and Br is a reference block of B. Coordinate positions of B' and B in the image are the same, coordinates of Br are (xr, yr), and coordinates of B' are (x, y). A displacement between the current to-be-encoded block and the reference block is referred to as an MV, that is:

$$MV=(xr-x, yr-y).$$

Considering that time domain or space domain adjacent blocks have relatively strong correlation, an MV prediction technology may be used to further reduce bits required for encoding the MV. In H.265/HFVC, the inter-frame prediction mode includes two MV prediction technologies: a Merge mode and an advanced motion vector prediction (AMVP) mode.

The Merge mode may establish a candidate MV list for a current prediction unit (PU), where there are 5 candidate MVs (and corresponding reference images) in the list. The 5 candidate MVs are traversed, and a candidate MV with minimum rate-distortion cost is selected as an optimal MV. If an encoder establishes a candidate list in the same manner, the encoder only needs to transmit an index of the optimal MV in the candidate list. The MV prediction technology in HEVC further includes a skip mode, which is a special case of the Merge mode. After the optimal MV is found in the Merge mode, if the current block and the reference block are basically the same, residual data does not need to be transmitted, and only the index of the optimal MV and a skip flag need to be transmitted.

Figure 3:
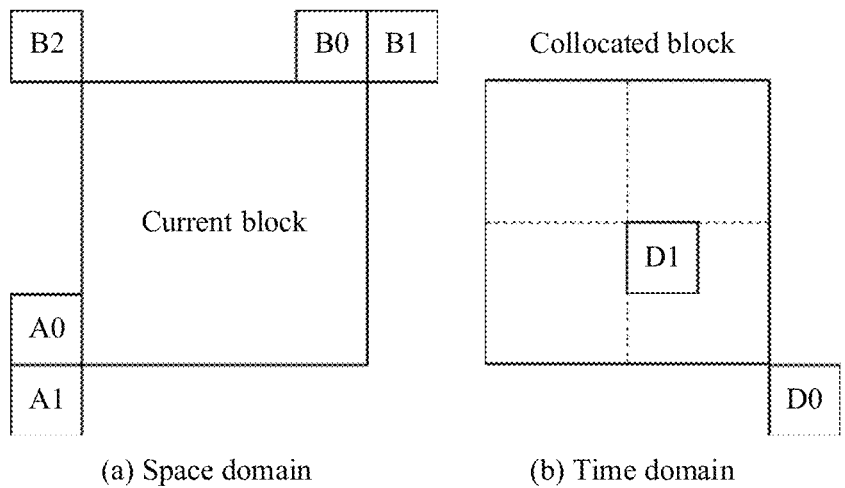
FIG. 3 is a schematic diagram of a candidate motion vector according to an embodiment of this application.

The MV candidate list established in the Merge mode includes two situations including a space domain and a time domain, and further includes a combined list for a B slice (a B-frame image). The space domain provides 4 candidate MVs at most, and an establishment process is shown by a part (a) in FIG. 3. The space domain list is established according to a sequence A1→B1→B0→A0→B2, where B2 is a substitute. That is, when one or more of A1, B1, B0, and A0 does not exist, motion information of B2 needs to be used. The time domain only provides 1 candidate MV at most, and an establishment process is shown by a part (b) in FIG. 3 and is obtained through expansion of an MV of a collocated PU according to the following formula:

$$curMV = td*colMV/tb, \text{ where}$$

curMV represents an MV of the current PU, colMV represents the MV of the collocated PU, td represents a distance between the current image and the reference image, and tb represents a distance between a collocated image and the reference image. If a PU at a position D0 on a collocated block is unavailable, a collocated PU at a position D1 is used for replacement. For a PU in the B Slice, because the PU includes two MVs, an MV candidate list thereof also needs to provide two motion vector predictors (MVPs). The HEVC combines first 4 candidate MVs in the MV candidate list in pairs, to generate a combined list for the B Slice.

Similarly, the AMVP mode uses the MV correlation of space domain and time domain adjacent blocks, to establish an MV candidate list for the current PU. Different from the Merge mode, an optimal prediction MV is selected in the MV candidate list of the AMVP mode, and differential encoding is performed on the optimal prediction MV and an optimal MV obtained by the current to-be-encoded block through motion searching, namely, encoding is performed on MVD=MV−MVP, where MVD is a motion vector difference. A decoder side establishes a same list, so that an MV of a current decoded block may be calculated only requiring serial numbers of the MVD and the MVP in the list. The MV candidate list of the AMVP mode also includes two situations of a space domain and a time domain, and a difference lies in that a length of the MV candidate list of the AMVP mode is only 2.

History based motion vector prediction (HMVP) is a newly adopted MV prediction technology in H.266/VVC. HMVP is a motion vector prediction method based on historical information. Motion information of a historical encoded block is stored in an HMVP list and is used as an MVP of a current coding unit (CU). H.266/VVC adds HMVP to the candidate list of the Merge mode, which ranks after time domain and space domain MVPs. The HMVP technology stores motion information of previous encoded blocks using a first input first output (FIFO) queue. If stored candidate motion information and motion information that is just encoded are the same, the repeated candidate motion information is first removed, and all HMVP candidate motion information moves forward, and the motion information of the current CU is added to an end of the FIFO queue. If the motion information of the current CU is different from any candidate motion information in the FIFO queue, the latest motion information is added to the end of the FIFO queue. When new motion information is added to the HMVP list, if the list has reached the maximum length, the first candidate motion information in the FIFO queue is removed, and the latest motion information is then added to the end of the FIFO queue. The HMVP list may be reset (emptied) in a case of encountering a new coding tree unit (CTU) row. In H.266/VVC, a size S of an HMVP list is set to 6, to reduce a number of redundancy checking operations, and the following simplification manners are introduced:

1. A number of pieces of HMVP candidate motion information used for Merge list generation is set to (N<=4) ?M:(8−N), where N represents a number of pieces of existing candidate motion information in the Merge list, and M represents a number of pieces of available HMVP candidate motion information in the Merge list.
2. Once an available length of the Merge list reaches a maximum permitted length minus one, a construction process for the combined candidate motion information list of HMVP is ended.

II. IBC Prediction Mode.

Figure 4:
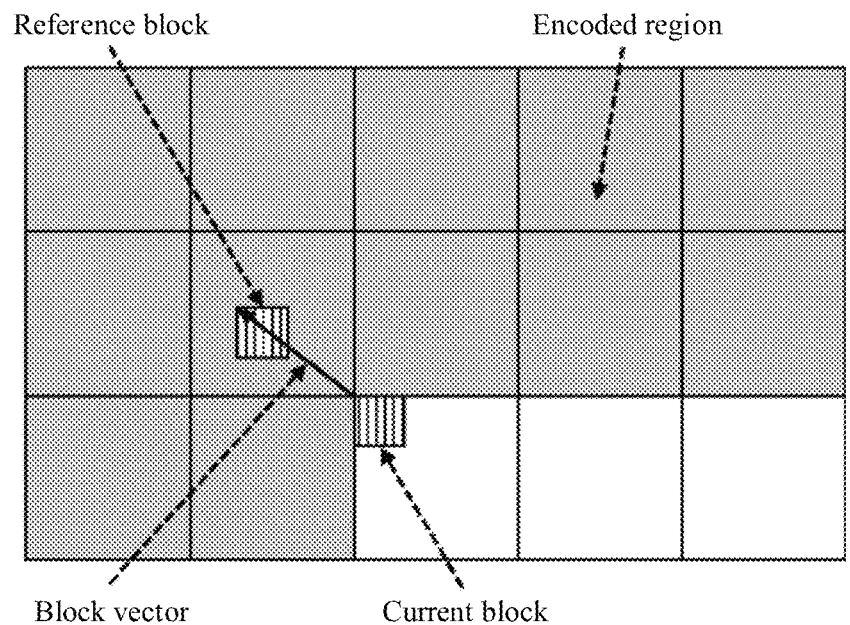
FIG. 4 is a schematic diagram of an intra block copy mode according to an embodiment of this application.

IBC is an intra-frame encoding tool adopted in screen content coding (SCC) expansion of HEVC, which significantly improves the efficiency of SCC. In AVS3 and VVC, the IBC technology is also adopted to improve the performance of SCC. The IBC technology predicts a pixel of a current to-be-encoded block by using correlation of a screen content video in space and using a pixel of an encoded image on the current image, so that bits required for encoding pixels can be effectively saved. As shown in FIG. 4, a displacement between a current and a reference block thereof in IBC is referred to as a BV. H.266/VVC adopts a BV prediction technology that is similar to intra-frame prediction to further save bits required for encoding BVs.

III. ISC Prediction Mode.

Figure 5:
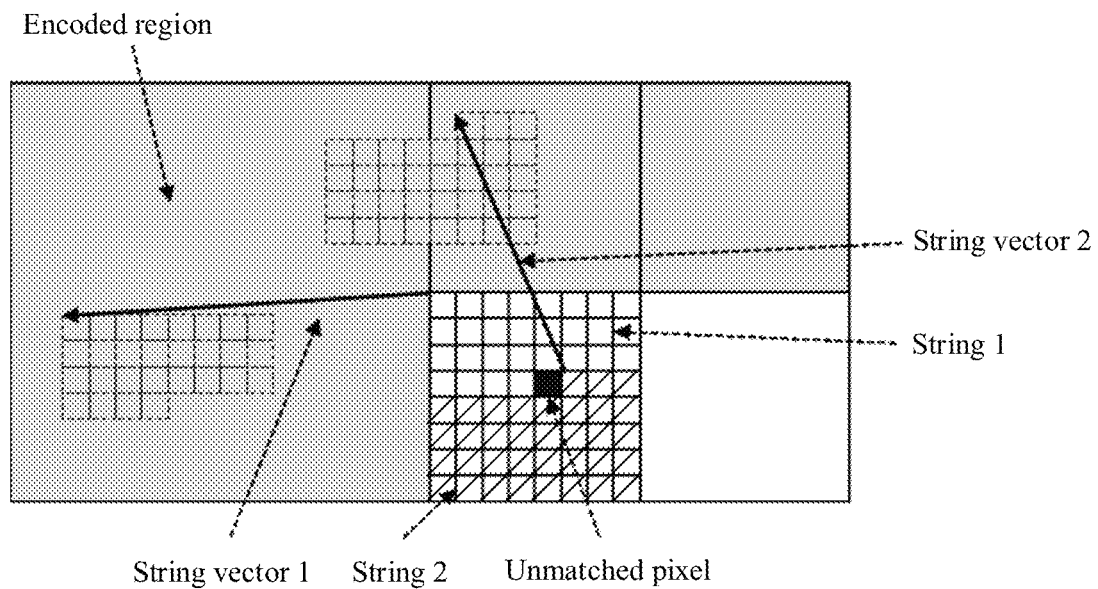
FIG. 5 is a schematic diagram of an intra string copy mode according to an embodiment of this application.

The ISC technology divides an encoded block into a series of pixel strings or unmatched pixels according to a scanning sequence (for example, raster scanning, reciprocating scanning, and Zig-Zag scanning). Similar to the IBC technology, a reference string in a same shape is searched in an encoded region of the current image for each string, a prediction value of a current string is exported, and encoding is performed on a residue between a pixel value and the prediction value of the current string instead of being directly performed on the pixel value, so that bits can be effectively saved. FIG. 5 is a schematic diagram of ISC, where dark gray regions are encoded regions, 28 white pixels are a string 1, 35 light gray pixels are a string 2, and 1 black pixel represents an unmatched pixel. A displacement between the string 1 and a reference string thereof is an SV 1 in FIG. 5; and A displacement between the string 2 and a reference string thereof is an SV 2 in FIG. 5.

The ISC technology needs to encode an SV, a string length, and an identifier whether there is a matched string corresponding to each string in the current encoded block. The SV represents a displacement from a to-be-encoded string to a reference string thereof. The string length represents a number of pixels included in the string. In different implementations, encoding on the string length have many manners, and some examples (a part of the examples may be combined for use) are given below: 1) Encoding is directly performed on the string length in a bitstream. 2) Encoding processing is performed on a number of subsequent to-be-processed pixels of the string in a bitstream, and the decoder side calculates, according to a size N of the current block, a number N1 of processed pixels, and the number N2 of the to-be-processed pixels obtained through decoding, a length L of the current string, L=N−N1−N2. 3) Encoding is performed on an identifier indicating whether the string is the last string in a bitstream, if the string is the last string, according to the size of the current block N and the number N1 of processed pixels, the length L of the current string is calculated, L=N−N1. If a corresponding reference is not found in a reference region for a pixel, encoding is directly performed on a pixel value of the unmatched pixel.

IV. Intra-Frame MVP Prediction in AVS3.

IBC and ISC are two SCC tools in AVS3, which both use the current image as a reference to export a prediction value of a CU through motion compensation. Considering that IBC and ISC include similar reference regions, and BV and SV include relatively high correlation, prediction between IBC and ISC may be permitted to further improve the encoding efficiency. AVS3 uses an intra-frame historical motion information prediction (IntraHMVP) list that is similar to HMVP to record MV information, position information, size information, and repetition times of the two types of encoded blocks, and export a block vector predictor (BVP) and a string vector predictor (SVP) through the IntraHMVP list. The BVP is a prediction value of a BV, and the SVP is a prediction value of an SV. To support parallel encoding, if a current LCU is a first LCU in a current row of a slice, a value of CntIntraHmvp in the IntraHMVP list is initialized to 0.

1. Export of BVP.

In AVS3, class based block vector prediction (CBVP) that is similar to HMVP is adopted. The method first uses a history based block vector prediction (HBVP) list to store information of historical IBC encoded blocks, and further records information such as positions and sizes of the historical encoded blocks in addition to recording BV information of the historical encoded blocks. For a current encoded block, candidate BVs in the HBVP list are classified according to the following conditions:

class 0: an area of the historical encoded block is greater than or equal to 64 pixels;
class 1: a frequency of the BV is greater than or equal to 2;
class 2: coordinates of an upper left corner of the historical encoded block is on the left of coordinates of an upper left corner of the current block;
class 3: the coordinates of the upper left corner of the historical encoded block is above the coordinates of the upper left corner of the current block;
class 4: the coordinates of the upper left corner of the historical encoded block is on an upper left side of the coordinates of the upper left corner of the current block;
class 5: the coordinates of the upper left corner of the historical encoded block is on an upper right side of the coordinates of the upper left corner of the current block; and
class 6: the coordinates of the upper left corner of the historical encoded block is on a lower left side of the coordinates of the upper left corner of the current block, where Instances in each class are arranged in a reverse sequence of an encoding sequence (the closer to the current block in the encoding sequence, the former the instance is ranked), and a BV corresponding to a first historical encoded block is a candidate BV corresponding to the class. The candidate BV corresponding to each class is then added to the CBVP list according to a sequence from the class 0 to the class 6. When a new BV is added to the CBVP list, whether a repeated BV already exists in the CBVP list needs to be checked. The BV is added to the CBVP list only when no repeated BV exists. The encoder side selects an optical candidate BV in the CBVP list as a BVP, and encodes an index in a bitstream to represent an index of a class corresponding to the optimal candidate BV in the CBVP list. The decoder side performs decoding to obtain the BVP from the CBVP list according to the index.

After the current PU is decoded, if a prediction type of the current PU is block copy intra-frame prediction (namely, IBC), when NumOfIntraHmvpCand is greater than 0, the IntraHMVP is updated according to block copy intra-frame prediction motion information of a current prediction block in a manner described below. The intra-frame prediction motion information of the current prediction block includes displacement vector information, position information, size information, and repetition times, where the displacement vector information of the current prediction block is a BV; the position information includes a horizontal coordinate and a vertical coordinate of an upper left corner of the current prediction block; the size information is a product of a width and a height; and the repetition times of the current prediction block is initialized to 0.

2. Export of SVP.

AVS3 encodes an index for each string in an ISC encoded block, to indicate a position of an SVP of the string in the IntraHMVP list. Similar to the skip mode in intra-frame prediction, an SV of a current string is equal to an SVP, and a residue between the SV and the SVP does not need to be encoded.

After the current PU is decoded, if a prediction type of the current PU is string copy intra-frame prediction (namely, ISC), when NumOfIntraHmvpCand is greater than 0, the IntraHMVP is updated according to string copy intra-frame prediction motion information of the current prediction block in a manner described below. The string copy intra-serial frame prediction motion information of the current prediction block includes displacement vector information, position information, size information, and repetition times, where the displacement vector information of a current string is an SV; the position information includes a horizontal coordinate and a vertical coordinate of a first pixel sample of the string, namely, (xi, yi); the size information is a string length of the part, namely, StrLen[i]; and the repetition times is initialized to 0.

3. Update of IntraHMVP List.

The intra-frame prediction motion information includes displacement vector information, position information, size information, and repetition times. After the current PU is decoded, if a prediction type of the current PU is block copy intra-frame prediction or string copy intra-frame prediction, when NumOfIntraHmvpCand is greater than 0, according to the intra-frame prediction motion information of the current prediction block, the IntraHmvpCandidateList is updated, and displacement vector information, position information, size information, and repetition times of IntraHmvpCandidateList[X] is respectively denoted as intraMvCandX, posCandX, sizeCandX, and cntCandX. Otherwise, operation defined by this condition are not performed.

a) X is initialized to 0, and cntCur is initialized to 0.
b) if CntIntraHmvp is equal to 0, IntraHmvpCandidateList[CntIntraHmvp] is the intra-frame prediction motion information of the current PU, and CntIntraHmvp is increased by 1.
c) otherwise, whether the intra-frame prediction motion information of the current prediction block is equal to IntraHmvpCandidateList[X] is determined according to whether intraMvCur is equal to intraMvCandX:
  1) if intraMvCur is equal to intraMvCandX, step d) is performed, or otherwise, X is increased by 1.
  2) if X is less than CntIntraHmvp, step c) is performed; or otherwise, step e) is performed.
d) a value of cntCur is equal to a value obtained by increasing a value of cntCandX by 1. If sizeCur is less than sizeCandX, sizeCur is equal to sizeCandX respectively at present.
e) if X is less than CntIntraHmvp:
  1) i ranges from X to CntIntraHmvp−1, to cause IntraHmvpCandidateList[i] to be equal to IntraHmvpCandidateList[i+1]; and 2) IntraHmvpCandidateList[CntIntraHmvp−1] is equal to the intra-frame prediction motion information of the current PU.

f) otherwise, if X is equal to CntIntraHmvp and CntIntraHmvp is equal to NumOfIntraHmvpCand:
1) i ranges from 0 to CntIntraHmvp−1, to cause IntraHmvpCandidateList[i] to be equal to IntraHmvpCandidateList[i+1]; and
2) IntraHmvpCandidateList[CntIntraHmvp−1] is equal to the intra-frame prediction motion information of the current PU.

g) otherwise, if X is equal to CntIntraHmvp and CntIntraHmvp is less than NumOfIntraHmvpCand, IntraHmvpCandidateList[CntIntraHmvp] is equal to the intra-frame prediction motion information of the current PU, and CntIntraHmvp is increased by 1.

In the existing AVS3 standard when displacement vector prediction is performed, a candidate motion information list is constructed by only constructing an IntraHMVP list, and a BVP or an SVP is exported. A maximum length of the IntraHMVP list is 12, and a maximum length of the candidate motion information list is 7. When the length of the IntraHMVP is insufficient or null, the candidate motion information list cannot be filled up. As a result, no enough motion information can be provided for displacement vector prediction.

This application provides a method for constructing a motion information list, which is used in combination with a historical motion information list. For example, when candidate motion information is insufficient, this method provides extra motion information for the candidate motion information list, to provide sufficient motion information for displacement vector prediction, so as to improve the video compression performance.

Figure 6:
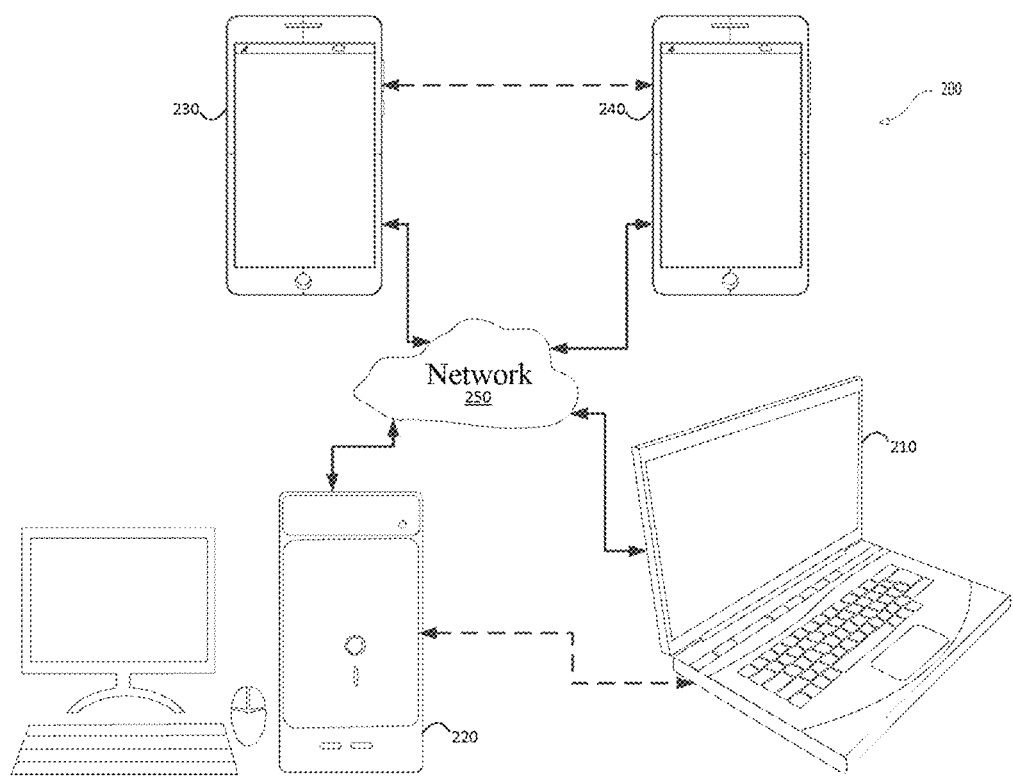
FIG. 6 is a simplified block diagram of a communication system according to an embodiment of this application.

FIG. 6 is a simplified block diagram of a communication system according to an embodiment of this application. The communication system 200 includes a plurality of devices, and the devices may communicate with each other through, for example, a network 250. For example, the communication system 200 includes a first device 210 and a second device 220 that are interconnected through the network 250. In the embodiment of FIG. 6, the first device 210 and the second device 220 perform unidirectional data transmission. For example, the first device 210 may perform encoding on video data, for example, a video picture stream acquired by the first device 210 to transmit the video data to the second device 220 through the network 250. Encoded video data is transmitted in the form of one or more encoded video bitstreams. The second device 220 may receive the encoded video data from the network 250, perform decoding on the encoded video data to restore the video data, and display a video picture according to the restored video data. The unidirectional data transmission is quite common in applications such as media service.

In another embodiment, the communication system 200 includes a third device 230 and a fourth device 240 performing bidirectional transmission of encoded video data, and for example, the bidirectional transmission may occur during a video conference. For bidirectional data transmission, each device in the third device 230 and the fourth device 240 may perform encoding on video data (for example, a video picture stream acquired by the device), to transmit the video data to the other device in the third device 230 and the fourth device 240 through the network 250. Each device in the third device 230 and the fourth device 240 may further receive encoded video data transmitted by the other device in the third device 230 and the fourth device 240, perform decoding on the encoded video data to restore the video data, and display a video picture on an accessible display apparatus according to the restored video data.

In the embodiment of FIG. 6, the first device 210, the second device 220, the third device 230, and the fourth device 240 may all be computer devices such as servers, personal computers, or smartphones, but the principle disclosed in this application is not limited thereto. The embodiments of this application are applicable to a personal computer (PC), a mobile phone, a tablet computer, a media player, and/or a dedicated video conference device. The network 250 represents any number of networks that transmit encoded video data among the first device 210, the second device 220, the third device 230, and the fourth device 240, including a wired and/or wireless communication network. The communication network 250 may exchange data in a circuit switching and/or packet switching channel. The network may include a telecommunication network, a local area network, a wide area network, and/or the Internet. For the purpose of this application, unless otherwise explained in the following description, the architecture and topology of the network 250 are unnecessary for operations disclosed in this application.

In an embodiment, FIG. 7 shows a placement manner of a video encoder and a video decoder in a streaming transmission environment. A subject disclosed in this application may be equally applicable to other applications supporting videos, including a video conference, a digital television (TV), and compressed videos stored on a digital medium such as a compact disc (CD), a digital versatile disc (DVD), and a memory stick.

A streaming transmission system may include an acquisition subsystem 313, the acquisition subsystem may include a video source 301 such as a digital camera, and the video source creates a video picture stream 302 that is not compressed. In an embodiment, the video picture stream 302 includes samples taken by the digital camera. Compared with encoded video data 304 (or an encoded video bitstream), the video picture stream 302 is described as a video picture stream highlighting a high data amount through a bold line, the video picture stream 302 may be processed by an electronic device 320, and the electronic device 320 includes a video encoder 303 coupled to the video source 301 The video encoder 303 may include hardware, software, or a combination of hardware and software to implement or perform various aspects of the subject disclosed and described in a more detailed manner in the following description. Compared with the video picture stream 302, the encoded video data 304 (or an encoded video bitstream 304) is described as encoded video data 304 (or an encoded video bitstream 304) highlighting a low data amount through a fine line, which may be stored on a streaming transmission server 305 for future use. One or more streaming transmission client sub-systems, for example, a client sub-system 306 and a client sub-system 308 in FIG. 7, may access the streaming transmission server 305 to retrieve a copy 307 and a copy 309 of the encoded video data 304. The client sub-system 306 may include, for example, a video decoder 310 in an electronic device 330. The video decoder 310 performs decoding on the inputted copy 307 of the encoded video data, and generate an outputted video picture stream 311 that may be presented on a display 312 (for example, a display screen) or another presentation apparatus (not depicted herein). In some streaming transmission systems, encoding may be performed on the encoded video data 304, video data 307, and video data 309 (for example, a video bitstream) according to some video encoding/compression standards.

The electronic device 320 and the electronic device 330 may include other components (not shown). For example, the electronic device 320 may include a video decoder (not shown), and the electronic device 330 may further include a video encoder (not shown). The video decoder is configured to perform decoding on received encoded video data; and the video decoder is configured to perform decoding on the video data.

The technical solution provided in the embodiments of this application may be applicable to the H.266/VVC standard, the H.265/HEVC standard, AVS (for example, AVS3), or next-generation video encoding and decoding standards, which is not limited in the embodiments of this application.

Further, an execution entity of the steps of the method provided in the embodiments of this application may be a decoder side device or may be an encoder side device. The technical solution provided in the embodiments of this application may be adopted in processes of both video decoding and video encoding, to construct a motion information list. The decoder side device and the encoder side device both may be a computer device, and the computer device is an electronic device having data computing, processing, and storage capabilities, such as a PC, a mobile phone, a tablet computer, a media player, a dedicated video conference device, or a server.

In addition, the method provided in this application may be used independently or may be combined with another method is any sequence. The encoder or the decoder based on the method provided in this application may be implemented through one or more processors or one or more integrated circuits.

In an exemplary embodiment, the decoder side is used as an example, export of a prediction displacement vector may include the following 3 steps:
1. A historical motion information list is used to record motion information of historical Pus (for example, decoded blocks or decoded strings) in a decoding process in a FIFO manner.
2. When decoding is performed on a displacement vector of a current PU (for example, a current block or a current string), a candidate motion information list is exported according to the historical motion information list in combination with other motion information.
3. A position (or referred to as an index) of a prediction displacement vector of the current PU in the candidate motion information list is obtained from a bitstream, and the prediction displacement vector of the current PU is exported.

In the embodiments of this application, a historical PU refers to an encoded (or decoded) image unit, where the image unit may include one or more pixels, and the image unit may be in a shape of a block or a string. For the IBC prediction mode, the historical PU is also referred to as a historical block, which refers to an encoded (or decoded) image block. For the ISC prediction mode, the historical PU is also referred to as a historical string, which refers to an encoded (or decoded) image string.

A current PU refers to a currently encoded (or decoded) image unit, where the image unit may similarly include one or more pixels, and the image unit may be in a shape of a block or a string.

This application provides a method for constructing a motion information list, and when motion information in a candidate motion information list is insufficient, this method can provide extra motion information for the candidate motion information list. The technical solutions of this application are described by using several embodiments below.

FIG. 8 is a flowchart of a method for constructing a motion information list in video encoding and decoding according to an embodiment of this application. For ease of description, the description is provided by only using a computer device as the execution entity of the steps. The method may include the following steps (801 and 802):

Step 801: Construct a space domain motion information list, the space domain motion information list including motion information of a space domain neighboring block of a current encoding and decoding block, and the space domain neighboring block including at least an ISC block.

In the embodiments of this application, the space domain neighboring block of the current encoding and decoding block refers to an encoding and decoding block belonging to the same image with the current encoding and decoding block and neighboring to the current encoding and decoding block in spatial positions. The "neighboring" herein may refer to that a distance to the current encoding and decoding block is less than a threshold, and the threshold may be set in combination with an actual situation. In addition, a calculation method for a distance between two encoding and decoding blocks may also be flexibly set. For example, the distance may be a distance between coordinates of upper left corners of the two encoding and decoding blocks, a distance between horizontal coordinates (or vertical coordinates) of the upper left corners of the two encoding and decoding blocks, a distance between central positions of the two encoding and decoding blocks, or a shortest distance between the two encoding and decoding blocks, which is not limited in the embodiments of this application. In an example, it is assumed that coordinates of an upper left corner of the current encoding and decoding block are (x0, y0) and coordinates of an upper left corner of another encoding and decoding block are (x1, y1), if a condition that |x0−x1|<a or |y0−y1|<b is met, it is determined that the another encoding and decoding block is a space domain neighboring block of the current encoding and decoding block. Values of a and b may be equal to each other or may not be equal to each other. For example, a=b=8.

Figure 9:
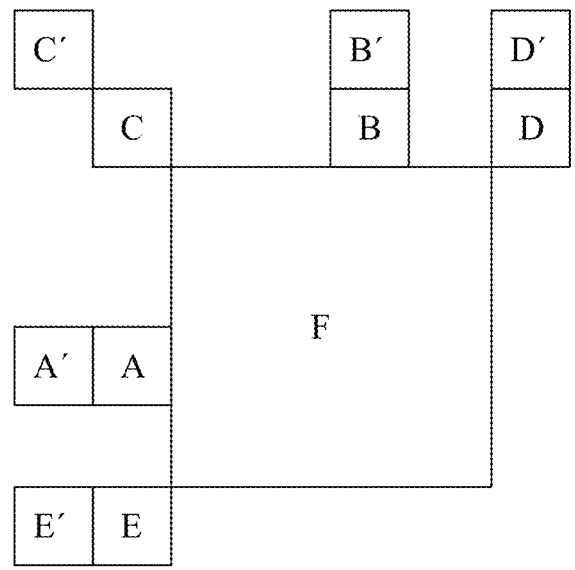
FIG. 9 is a schematic diagram of space domain neighboring blocks according to an embodiment of this application.

The space domain adjacent block includes a space domain adjacent block and a space domain non-adjacent block. The space domain adjacent block of the current encoding and decoding block refers to an encoding and decoding block belonging to the same image with the current encoding and decoding block and neighboring and adjacent to the current encoding and decoding block in spatial positions. The "neighboring and adjacent" may refer to that there is an edge or a vertex overlapping with that of the current encoding and decoding block. For example, as shown in FIG. 9, space domain adjacent blocks of a current encoding and decoding block F may include encoding and decoding blocks such as A, B, C, D, and E. The space domain non-adjacent block of the current encoding and decoding block refers to an encoding and decoding block belonging to the same image with the current encoding and decoding block and neighboring and non-adjacent to the current encoding and decoding block in spatial positions. The "neighboring and non-adjacent" may refer to that a distance to the current encoding and decoding block is less than a threshold, but there is no edge or vertex overlapping with that of the current encoding and decoding block. For example, as shown in FIG. 9, space domain non-adjacent blocks of the current encoding and decoding block F may include encoding and decoding blocks such as A', B', C', D', and E'.

In the embodiments of this application, the space domain neighboring block includes an ISC block, and the "ISC block" refers to an encoding and decoding block on which MV prediction is performed in the ISC prediction mode. In some embodiments, the space domain neighboring block (namely, the ISC block) includes at least one of the following: a space domain adjacent ISC block or a space domain non-adjacent ISC block. The space domain adjacent ISC block of the current encoding and decoding block refers to a space domain adjacent block of the current encoding and decoding block and the space domain adjacent block being an ISC block. The space domain non-adjacent ISC block of the current encoding and decoding block refers to a space domain non-adjacent block of the current encoding and decoding block and the space domain non-adjacent block being an ISC block.

In some embodiments, the space domain neighboring block further includes an IBC block, and the "IBC block" refers to an encoding and decoding block on which MV prediction is performed in the IBC prediction mode. In some embodiments, the space domain neighboring block (namely, the IBC block) includes at least one of the following: a space domain adjacent IBC block or a space domain non-adjacent IBC block. The space domain adjacent IBC block of the current encoding and decoding block refers to a space domain adjacent block of the current encoding and decoding block and the space domain adjacent block being an IBC block. The space domain non-adjacent IBC block of the current encoding and decoding block refers to a space domain non-adjacent block of the current encoding and decoding block and the space domain non-adjacent block being an IBC block.

In some embodiments, when the space domain neighboring block includes an ISC block, because one ISC block may include one or more encoding and decoding strings (or referred to as "ISC strings" or "strings", and meanings thereof may be understood by a person skilled in the art), motion information of the ISC block may include an SV of one encoding and decoding string in the ISC block, SVs of a plurality of encoding and decoding strings in the ISC block, or one or more SVs determined based on SVs of one or more encoding and decoding strings in the ISC block, which is not limited in this embodiments of this application.

For example, when the space domain neighboring block includes an ISC block, motion information of the ISC block includes at least one of the following:
1. an SV of a first encoding and decoding string in the ISC block according to a scanning sequence;
2. an SV of a last encoding and decoding string in the ISC block according to a scanning sequence;
3. a mean of an SV of a first encoding and decoding string and an SV of a last encoding and decoding string in the ISC block according to a scanning sequence;
4. a weighted mean of an SV of a first encoding and decoding string and an SV of a last encoding and decoding string in the ISC block according to a scanning sequence; or
5. SVs of a plurality of encoding and decoding strings in the ISC block.

Certainly, the motion information of the ISC block listed above is only exemplary and explanatory, and the embodiments of this application are not limited thereto and may further have other implementations.

In an exemplary embodiment, the space domain neighboring block mentioned above includes the space domain adjacent blocks A to E and the space domain non-adjacent blocks A' to E' shown in FIG. 9, which are all minimum encoding and decoding units, namely, a minimum size (for example, 4*4) into which a CU is permitted to be divided. For any space domain neighboring block, if the space domain neighboring block is an IBC block or an ISC block, corresponding BV or SV information refers to BV or SV information of an entire encoding and decoding block in which the space domain neighboring block (a 4*4 small block) is located. When BV or SV information of one encoding and decoding block is stored, BV or SV information corresponding to each minimum encoding and decoding unit (for example, a 4*4 small block) belonging to the encoding and decoding block may be stored.

In some embodiments, when an SV corresponding to a minimum encoding and decoding unit is stored, a manner thereof includes, but not limited to, one of the following manners:
1. storing an SV of a first encoding and decoding string in the encoding and decoding block;
2. storing an SV of a last encoding and decoding string in the encoding and decoding block;
3. storing an SV of a first encoding and decoding string and an SV of a last encoding and decoding string in the encoding and decoding block; and
4. for a space domain adjacent block, storing an SV of a first encoding and decoding string and an SV of a last encoding and decoding string in the encoding and decoding block; and for a space domain non-adjacent block, storing an SV of a first encoding and decoding string or an SV of a last encoding and decoding string in the encoding and decoding block.

Certainly, the manner for storing the SV corresponding to the minimum encoding and decoding unit listed above is only exemplary and explanatory, and the embodiments of this application are not limited thereto and may further include other implementations.

Referring to FIG. 9, it is assumed that coordinates of an upper left corner of the current encoding and decoding block F are (cur_x_pos, cur_y_pos), a width of the current encoding and decoding block F is cu width and a height thereof is cu height. The following Table 1 shows coordinates of upper left corners of the space domain adjacent blocks A to E of the current encoding and decoding block F. In Table 1, neig_x_pos represents a horizontal coordinate of the coordinates of an upper left corner of a space domain adjacent block, neig_y_pos represents a vertical coordinate of the coordinates of the upper left corner of the space domain adjacent block, and a size of each of the space domain adjacent blocks A to E is 4*4.

TABLE 1

| Position of space domain adjacent block | neig_x_pos | neig_y_pos |
|---|---|---|
| Left (A) | cur_x_pos − 4 | cur_y_pos + cu_height/2 |
| Upper (B) | cur_x_pos + cu_width/2 | cur_y_pos − 4 |
| Upper left (C) | cur_x_pos − 4 | cur_y_pos − 4 |
| Upper right (D) | cur_x_pos + cu_width | cur_y_pos − 4 |
| Lower left (E) | cur_x_pos − 4 | cur_y_p°s + cu_height |

The following Table 2 shows coordinates of upper left corners of the space domain non-adjacent blocks A' to E' of the current encoding and decoding block F. In Table 2, neig_x_pos represents a horizontal coordinate of the coordinates of the upper left corner of the space domain non-adjacent block, neig_y_pos represents a vertical coordinate of the coordinates of the upper left corner of the space domain non-adjacent block, and a size of each of the space domain non-adjacent blocks A' to E' is also 4*4.

TABLE 2

| Position of space domain non-adjacent block | neig_x_pos | neig_y_pos |
| --- | --- | --- |
| Left (A') | cur_x_pos − 8 | cur_y_pos + cu_height/2 |
| Upper (B') | cur_x_pos + cu_width/2 | cur_y_pos − 8 |
| Upper left (C') | cur_x_pos − 8 | cur_y_pos − 8 |
| Upper right (D') | cur_x_pos + cu_width | cur_y_pos − 8 |
| Lower left (E') | cur_x_pos − 8 | cur_y_pos + cu_height |

Step 802: Obtain at least one piece of motion information from the space domain motion information list when motion information in a candidate motion information list is insufficient, and fill the candidate motion information list using the at least one piece of motion information, the candidate motion information list being used for providing a candidate prediction displacement vector for the current encoding and decoding block.

In an example, when the current encoding and decoding block is an IBC block, at least one piece of motion information is obtained from the space domain motion information list when motion information in the candidate motion information list is insufficient, and the candidate motion information list is filled using the at least one piece of motion information.

In another example, when the current encoding and decoding block is an ISC block, at least one piece of motion information is obtained from the space domain motion information list when motion information in the candidate motion information list is insufficient, and the candidate motion information list is filled using the at least one piece of motion information.

In addition, the motion information in the candidate motion information list being insufficient may refer to that a length of the candidate motion information list is less than a threshold. The length of the candidate motion information list refers to a number of pieces of motion information included in the candidate motion information list. In some embodiments, the threshold is a maximum length of the candidate motion information list. For example, it is assumed that the maximum length of the candidate motion information list is 7, when the length of the candidate motion information list is less than 7, extra motion information is used to fill the candidate motion information list. In some embodiments, the threshold is less than the maximum length of the candidate motion information list. For example, it is assumed that the maximum length of the candidate motion information list is 7, the threshold may be set to 5, and when the length of the candidate motion information list is less than 5, extra motion information is used to fill the candidate motion information list.

By adding the at least one piece of motion information obtained from the space domain motion information list to the candidate motion information list, the candidate motion information list is filled.

In an example, duplication checking and comparison is not performed, and the at least one piece of motion information is directly added to the candidate motion information list. For example, when the candidate motion information list is empty, the at least one piece of motion information may be directly added to the candidate motion information list without duplication checking and comparison; or even if when the candidate motion information list is not empty, the at least one piece of motion information may also be directly added to the candidate motion information list without duplication checking and comparison.

In another example, duplication checking and comparison is performed on to-be-added motion information and motion information already existing in the candidate motion information list; and the candidate motion information list is updated according to a duplication checking and comparison result. For example, if the to-be-added motion information is the same as motion information (denoted as target motion information) already existing in the candidate motion information list, it indicates that there is duplication, the computer device may add the to-be-added motion information to the candidate motion information list after deleting the target motion information from the candidate motion information list, or may not add the to-be-added motion information to the candidate motion information list. In some embodiments, motion information is added to the candidate motion information list one by one, and duplication checking and comparison is performed on each piece of added motion information and the motion information already existing in the list. Certainly, the duplication checking and comparison manner described above is only exemplary and explanatory, and the embodiments of this application are not limited thereto and may further adopt other manners.

In an example, the candidate motion information list is used for providing a candidate BVP for an IBC block. When the current encoding and decoding block is an IBC block, the encoder side may find an index of a BVP of a current block from the candidate motion information list and encode the index to a bitstream; and the decoder side may obtain the index of the BVP of the current block from the bitstream and then export the BVP of the current block from the candidate motion information list according to the index. In the embodiments of this application, by filling the candidate motion information list of the current block using motion information of a space domain neighboring ISC block (e.g, a space domain neighboring block is also included), more candidate BVPs that are more effective are provided for the current block, thereby helping improve the video compression performance.

In another example, the candidate motion information list is used for providing a candidate SVP for an ISC block. When the current encoding and decoding block is an ISC block, the encoder side may find an index of an SVP of a current string from the candidate motion information list and encode the index to a bitstream; and the decoder side may obtain the index of the SVP of the current string from the bitstream and then export the SVP of the current string from the candidate motion information list according to the index. In the embodiments of this application, by filling the candidate motion information list of the current string using motion information of a space domain neighboring ISC block (e.g., a space domain neighboring block is also included), more candidate SVPs that are more effective are provided for the current string, thereby helping improve the video compression performance.

In another example, the candidate motion information list is used for providing a candidate BVP for an IBC block and providing a candidate SVP for an ISC string. That is, the IBC block and the ISC string may share the same candidate motion information list, so that it is unnecessary to maintain a plurality of candidate motion information lists, thereby reducing the complexity of encoding and decoding.

By adopting the technical solution provided in the embodiments of this application, on one hand, motion information may be exported from the historical motion information list to fill the candidate motion information list; and on the other hand, motion information may also be exported from the space domain motion information list to fill the candidate motion information list. For arrangement positions of motion information with two different sources in the candidate motion information list, the following several possible implementations may be included, but this application is not limited thereto:

1. A position of the motion information exported from the space domain motion information list in the candidate motion information list is in front of a position of the motion information exported from the historical motion information list in the candidate motion information list.
2. A position of the motion information exported from the space domain motion information list in the candidate motion information list is behind a position of the motion information exported from the historical motion information list in the candidate motion information list.
3. The motion information exported from the space domain motion information list is at a set position in the candidate motion information list.
4. When at least one position in the candidate motion information list does not include motion information, the motion information exported from the space domain motion information list is filled in the at least one position.

For the $3^{rd}$ point, for example, if the candidate motion information list includes 7 positions from 0 to 6, and the space domain motion information list includes motion information of 5 space domain adjacent blocks of A, B, C, D, and E in FIG. 9, the motion information of A, B, A, B, C, D, and E may be respectively filled in the 7 positions. In another example, the motion information of A may be filled in all the 7 positions.

For the $4^{th}$ point, the motion information is sequentially filled in the at least one position according to a sequence in the space domain motion information list during filling. For example, if the space domain motion information list includes the motion information of the 5 space domain adjacent blocks of A, B, C, D, and E sequentially, and a first position, a third position, and a fourth position in the candidate motion information list are empty, the motion information of A may be filled in the first position of the candidate motion information list, the motion information of B may be filled in the third position of the candidate motion information list, and the motion information of C may be filled in the fourth position of the candidate motion information list. Alternatively, motion information at a specified position in the space domain motion information list is filled in the at least one position. For example, if the space domain motion information list includes the motion information of the 5 space domain adjacent blocks of A, B, C, D, and E sequentially, and a first position, a third position, and a fourth position in the candidate motion information list are empty, the motion information at specified positions (for example, the first position and the second position) in the space domain motion information list is filled in the 3 positions. In an example, the motion information of A may be filled in the first position of the candidate motion information list, the motion information of B may be filled in the third position of the candidate motion information list, and the motion information of A may be filled in the fourth position of the candidate motion information list.

An example in which the candidate motion information list is the CBVP list described above is used, if motion information in a class is insufficient (for example, a number of pieces of motion information of the class not exported or exported from the historical motion information list is insufficient), when the space domain motion information list includes motion information of the class, the motion information of the class may be exported from the space domain motion information list to the class.

In some embodiments, the candidate motion information list may also be filled using preset motion information when the motion information in the candidate motion information list is insufficient. The preset motion information may be predefined in a standard or protocol. For example, the preset motion information includes a displacement vector (0, 0).

In an example, if motion information in a class is insufficient (for example, the historical motion information list does not include motion information of the class), and the space domain motion information list also does not include motion information of the class or the space domain motion information list cannot provide sufficient motion information, the candidate motion information list may be filled using the preset motion information (for example, (0, 0)).

Based on the above, according to the technical solution provided in the embodiments of this application, by filling the candidate motion information list using the space domain adjacent motion information when the motion information included in the candidate motion information list is insufficient, content of the candidate motion information list is expanded, so that more displacement vectors that are more effective are provided in the candidate motion information list to achieve a better displacement vector prediction effect, thereby improving the video compression performance.

Because the current encoding and decoding block may include a plurality of space domain neighboring blocks, for example, space domain neighboring blocks at a plurality of different positions such as the left side, the upper side, the upper left side, the upper right side, and the lower left side, when a space domain motion information list is constructed, motion information of the space domain neighboring blocks may be selected according to a specific sequence and added to the space domain motion information list. A construction process of a space domain motion information list is described below through some examples.

Example 1: Construction of a space domain motion information list may include the following steps:

1. Detect whether the current encoding and decoding block includes available motion information of a space domain adjacent block.

In the embodiments of this application, the space domain adjacent block includes a space domain adjacent ISC block and in some cases, further includes a space domain adjacent IBC block.

An example in which the space domain adjacent block includes a space domain adjacent ISC block is used, if the current encoding and decoding block includes a space domain adjacent ISC block, and the ISC block can provide available motion information (for example, motion information of the ISC block is stored), it is determined that the current encoding and decoding block includes available motion information of a space domain adjacent block. Otherwise, if the current encoding and decoding block does not include a space domain adjacent ISC block, or even includes a space domain adjacent ISC block but the ISC block cannot provide available motion information (for example, motion information of the ISC block is not stored), it is determined that the current encoding and decoding block does not include available motion information of a space domain adjacent block.

2. Obtain and add the available motion information of the space domain adjacent block to the space domain motion information list when the current encoding and decoding block comprises the available motion information of the space domain adjacent block.

3. Detect whether the current encoding and decoding block includes available motion information of a space domain non-adjacent block when the current encoding and decoding block does not include the available motion information of the space domain adjacent block or the constructed space domain motion information list is not filled up.

In the embodiments of this application, the space domain non-adjacent block includes at least one of a space domain non-adjacent ISC block or a space domain non-adjacent IBC block. In addition, for explanation and description of the available motion information of the space domain non-adjacent block, reference may be made to the explanation and description of the available motion information of the space domain adjacent block, and details are not described herein again.

4. Obtain and add the available motion information of the space domain non-adjacent block to the space domain motion information list when the current encoding and decoding block includes the available motion information of the space domain non-adjacent block.

In addition, if the current encoding and decoding block does not include the available motion information of the space domain adjacent block and the space domain non-adjacent block, it indicates that extra motion information cannot be provided by the space domain adjacent block for the candidate motion information list.

In addition, when the current encoding and decoding block includes a plurality of space domain adjacent blocks, whether the space domain adjacent blocks include available motion information may be detected according to a first set sequence one by one; and similarly, when the current encoding and decoding block includes a plurality of space domain non-adjacent blocks, whether the space domain non-adjacent blocks include available motion information may be detected according to a second set sequence one by one. For example, referring to FIG. 9, the first set sequence may be A→B→C→D→E, and the second set sequence may be A'→B'→C'→D'→E'. Certainly, the description of the first set sequence and the second set sequence herein is only exemplary and explanatory, and this application is not limited thereto and may adopt other sequences.

In this example, the motion information of the space domain adjacent block is preferentially used to fill the candidate motion information list, and when the space domain adjacent block cannot provide available motion information or the provided available motion information is insufficient, the motion information of the space domain non-adjacent block is used to fill the candidate motion information list, to ensure a filling effect of the candidate motion information list as much as possible.

Example 2: Construction of a space domain motion information list may include the following steps:

1. Traverse a plurality of position sets according to a preset sequence, where each of the position sets includes a space domain adjacent block and a space domain non-adjacent block.

2. Detect, for each of the position sets, whether the space domain adjacent block included in the position set includes available motion information.

3. Obtain and add, when the space domain adjacent block includes available motion information, the available motion information of the space domain adjacent block to the space domain motion information list.

4. Detect whether the space domain non-adjacent block included in the position set includes available motion information when the space domain adjacent block does not include available motion information.

5. Obtain and add, when the space domain non-adjacent block includes available motion information, the available motion information of the space domain non-adjacent block to the space domain motion information list.

In addition, if the space domain non-adjacent block also does not include available motion information, it indicates that the position set cannot provide available motion information.

For example, referring to FIG. 9, 5 position sets are included: (A, A'), (B, B'), (C, C'), (D, D'), and (E, E'). The set sequence may be {A→A', B→B', C→C', D→D', E→E'}. For example, for each position (including the space domain adjacent block and the space domain non-adjacent block, and X is equal to A, B, C, D, or E), whether the space domain adjacent block X is an ISC block is detected first, if yes, a corresponding SV is obtained, and a next position is detected then; otherwise, whether the space domain non-adjacent block X' is an ISC block or IBC block is detected, if yes, a corresponding SV or BV is obtained; or otherwise, it is considered that motion information cannot be obtained from the position, and a next position is detected then. Certainly, the description of the set sequence herein is only exemplary and explanatory, and this application is not limited thereto and may further adopt other sequences.

In this example, a plurality of position sets are traversed to select the motion information of the space domain adjacent block, for each of the position sets, the motion information of the space domain adjacent block is preferentially used, and when the space domain adjacent block cannot provide available motion information, the motion information of the space domain non-adjacent block is used, to ensure a filling effect of the candidate motion information list as much as possible.

Example 3: Construction of a space domain motion information list may include the following steps:

1. Detect whether the current encoding and decoding block includes available motion information of a space domain non-adjacent block.

In the embodiments of this application, the space domain non-adjacent block includes at least one of a space domain non-adjacent ISC block or a space domain non-adjacent IBC block.

2. Obtain and add the available motion information of the space domain non-adjacent block to the space domain motion information list when the current encoding and decoding block includes the available motion information of the space domain non-adjacent block.

3. Detect whether the current encoding and decoding block includes available motion information of a space domain adjacent block when the current encoding and decoding block does not include the available motion information of the space domain non-adjacent block or the constructed space domain motion information list is not filled up.

In the embodiments of this application, the space domain adjacent block includes a space domain adjacent ISC block and in some cases, further includes a space domain adjacent IBC block.

4. Obtain and add the available motion information of the space domain adjacent block to the space domain motion information list when the current encoding and decoding block includes the available motion information of the space domain adjacent block.

In addition, if the current encoding and decoding block does not include the available motion information of the space domain non-adjacent block and the space domain adjacent block, it indicates that extra motion information cannot be provided by the space domain adjacent block for the candidate motion information list.

In addition, when the current encoding and decoding block includes a plurality of space domain non-adjacent blocks, whether the space domain non-adjacent blocks include available motion information may be detected according to a second set sequence one by one; and similarly, when the current encoding and decoding block includes a plurality of space domain adjacent blocks, whether the space domain adjacent blocks include available motion information may be detected according to a first set sequence one by one. For example, referring to FIG. 9, the first set sequence may be A→B→C→D→E, and the second set sequence may be A'→B'→C'→D'→E'. Certainly, the description of the first set sequence and the second set sequence herein is only exemplary and explanatory, and this application is not limited thereto and may adopt other sequences.

In this example, the motion information of the space domain non-adjacent block is preferentially used to fill the candidate motion information list, and when the space domain non-adjacent block cannot provide available motion information or the provided available motion information is insufficient, the motion information of the space domain adjacent block is used to fill the candidate motion information list, to ensure a filling effect of the candidate motion information list as much as possible.

Example 4: Construction of a space domain motion information list may include the following steps:
 1. Traverse a plurality of position sets according to a preset sequence, where each of the position sets includes a space domain adjacent block and a space domain non-adjacent block.
 2. Detect, for each of the position sets, whether the space domain non-adjacent block included in the position set includes available motion information.
 3. Obtain and add, when the space domain non-adjacent block includes available motion information, the available motion information of the space domain non-adjacent block to the space domain motion information list.
 4. Detect whether the space domain adjacent block included in the position set includes available motion information when the space domain non-adjacent block does not include available motion information.
 5. Obtain and add, when the space domain adjacent block includes available motion information, the available motion information of the space domain adjacent block to the space domain motion information list.

In addition, if the space domain adjacent block also does not include available motion information, it indicates that the position set cannot provide available motion information.

For example, referring to FIG. 9, 5 position sets are included: (A, A'), (B, B'), (C, C'), (D, D'), and (E, E'). The set sequence may be {A'→A, B'→B, C'→C, D'→D, E'→E}. For example, for each position (including the space domain adjacent block and the space domain non-adjacent block, and X is equal to A, B, C, D, or E), whether the space domain non-adjacent block X' is an ISC or IBC block is detected first, if yes, a corresponding SV or BV is obtained, and a next position is detected then; otherwise, whether the space domain adjacent block X is an ISC block is detected, if yes, a corresponding SV is obtained; or otherwise, it is considered that motion information cannot be obtained from the position, and a next position is detected then. Certainly, the description of the set sequence herein is only exemplary and explanatory, and this application is not limited thereto and may further adopt other sequences.

In this example, a plurality of position sets are traversed to select the motion information of the space domain adjacent block, for each of the position sets, the motion information of the space domain non-adjacent block is preferentially used, and when the space domain non-adjacent block cannot provide available motion information, the motion information of the space domain adjacent block is used, to ensure a filling effect of the candidate motion information list as much as possible.

Example 5: Construction of a space domain motion information list may include the following steps:
 1. Detect whether the current encoding and decoding block includes available motion information of a space domain adjacent block.

In the embodiments of this application, the space domain adjacent block includes a space domain adjacent ISC block and in some cases, further includes a space domain adjacent IBC block.
 2. Obtain and add the available motion information of the space domain adjacent block to the space domain motion information list when the current encoding and decoding block includes the available motion information of the space domain adjacent block.

In addition, if the current encoding and decoding block does not include the available motion information of the space domain adjacent block, it indicates that extra motion information cannot be provided by the space domain adjacent block for the candidate motion information list.

In an example, a plurality of positions are traversed according to a preset sequence, where each of the positions includes a space domain adjacent block; for each of the positions, whether the space domain adjacent block of the position includes available motion information is detected; and when the space domain adjacent block includes available motion information, the available motion information of the space domain adjacent block is obtained and added to the space domain motion information list.

For example, when the current encoding and decoding block includes a plurality of space domain adjacent blocks, whether the space domain adjacent blocks include available motion information may be detected according to a first set sequence one by one. For example, referring to FIG. 9, the first set sequence may be A-*B-*C-*D-*E. Certainly, the description of the first set sequence herein is only exemplary and explanatory, and this application is not limited thereto and may further adopt other sequences.

A plurality of manners for constructing a space domain motion information list are provided in the embodiments of this application. Certainly, this application is not limited thereto and may further adopt other manners to construct a space domain motion information list, which may be flexibly designed.

The following is an apparatus embodiment of this application, which can be used to perform the method embodiments of this application. For details not disclosed in the apparatus embodiment of this application, reference may be made to the method embodiments of this application.

Figure 10:
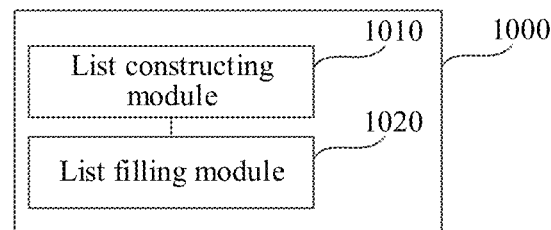
FIG. 10 is a block diagram of an apparatus for constructing a motion information list in video encoding and decoding according to an embodiment of this application.

FIG. 10 is a block diagram of an apparatus for constructing a motion information list in video encoding and decoding according to an embodiment of this application. The apparatus has functions of implementing the foregoing method examples. The functions may be implemented by hardware, or may be implemented by hardware executing corresponding software. The apparatus may be the computer device described above, or may be arranged on the computer device. The apparatus 1000 may include a list constructing module 1010 and a list filling module 1020.

The list constructing module 1010 is configured to construct a space domain motion information list, where the space domain motion information list includes motion information of a space domain neighboring block of a current encoding and decoding block, and the space domain neighboring block includes at least an intra string copy (ISC) block.

The list filling module 1020 is configured to obtain at least one piece of motion information from the space domain motion information list when motion information in a candidate motion information list is insufficient, and fill the candidate motion information list using the at least one piece of motion information, where the candidate motion information list is used for providing a candidate prediction displacement vector for the current encoding and decoding block.

In an exemplary embodiment, the ISC block includes at least one of the following: a space domain adjacent ISC block or a space domain non-adjacent ISC block.

In an exemplary embodiment, the space domain neighboring block further includes at least one of the following: a space domain adjacent IBC block or a space domain non-adjacent IBC block.

In an exemplary embodiment, the candidate motion information list is used for providing a candidate block vector predictor (BVP) for an IBC block; or the candidate motion information list is used for providing a candidate string vector predictor (SVP) for an ISC string; or the candidate motion information list is used for providing a candidate BVP for an IBC block and providing a candidate SVP for an ISC string.

In an exemplary embodiment, when the space domain neighboring block includes an ISC block, motion information of the ISC block includes at least one of the following:
a string vector (SV) of a first encoding and decoding string in the ISC block according to a scanning sequence;
an SV of a last encoding and decoding string in the ISC block according to a scanning sequence;
a mean of an SV of a first encoding and decoding string and an SV of a last encoding and decoding string in the ISC block according to a scanning sequence;
a weighted mean of an SV of a first encoding and decoding string and an SV of a last encoding and decoding string in the ISC block according to a scanning sequence; or
SVs of a plurality of encoding and decoding strings in the ISC block.

In an exemplary embodiment, the list constructing module 1010 is configured to:
detect whether the current encoding and decoding block includes available motion information of a space domain adjacent block, where the space domain adjacent block includes a space domain adjacent ISC block;
obtain and add the available motion information of the space domain adjacent block to the space domain motion information list when the current encoding and decoding block includes the available motion information of the space domain adjacent block;
detect whether the current encoding and decoding block includes available motion information of a space domain non-adjacent block when the current encoding and decoding block does not include the available motion information of the space domain adjacent block or the constructed space domain motion information list is not filled up, where the space domain non-adjacent block includes at least one of a space domain non-adjacent ISC block or a space domain non-adjacent IBC block; and
obtain and add the available motion information of the space domain non-adjacent block to the space domain motion information list when the current encoding and decoding block includes the available motion information of the space domain non-adjacent block.

In an exemplary embodiment, the list constructing module 1010 is configured to:
traverse a plurality of position sets according to a preset sequence, where each of the position sets includes a space domain adjacent block and a space domain non-adjacent block;
detect, for each of the position sets, whether the space domain adjacent block included in the position set includes available motion information;
obtain and add, when the space domain adjacent block includes available motion information, the available motion information of the space domain adjacent block to the space domain motion information list;
detect whether the space domain non-adjacent block included in the position set includes available motion information when the space domain adjacent block does not include available motion information; and
obtain and add, when the space domain non-adjacent block includes available motion information, the available motion information of the space domain non-adjacent block to the space domain motion information list.

In an exemplary embodiment, the list constructing module 1010 is configured to:
detect whether the current encoding and decoding block includes available motion information of a space domain non-adjacent block, where the space domain non-adjacent block includes at least one of a space domain non-adjacent ISC block or a space domain non-adjacent IBC block;
obtain and add the available motion information of the space domain non-adjacent block to the space domain motion information list when the current encoding and decoding block includes the available motion information of the space domain non-adjacent block;
detect whether the current encoding and decoding block includes available motion information of a space domain adjacent block when the current encoding and decoding block does not include the available motion information of the space domain non-adjacent block or the constructed space domain motion information list is not filled up, where the space domain adjacent block includes a space domain adjacent ISC block; and
obtain and add the available motion information of the space domain adjacent block to the space domain motion information list when the current encoding and decoding block includes the available motion information of the space domain adjacent block.

In an exemplary embodiment, the list constructing module 1010 is configured to: traverse a plurality of position sets according to a preset sequence, where each of the position sets includes a space domain adjacent block and a space domain non-adjacent block;
  detect, for each of the position sets, whether the space domain non-adjacent block included in the position set includes available motion information;
  obtain and add, when the space domain non-adjacent block includes available motion information, the available motion information of the space domain non-adjacent block to the space domain motion information list;
  detect whether the space domain adjacent block included in the position set includes available motion information when the space domain non-adjacent block does not include available motion information; and
  obtain and add, when the space domain adjacent block includes available motion information, the available motion information of the space domain adjacent block to the space domain motion information list.

In an exemplary embodiment, the list constructing module 1010 is configured to:
  traverse a plurality of positions according to a preset sequence, where each of the positions includes a space domain adjacent block;
  detect, for each of the positions, whether the space domain adjacent block of the position includes available motion information; and
  obtain and add, when the space domain adjacent block includes available motion information, the available motion information of the space domain adjacent block to the space domain motion information list.

In an exemplary embodiment, a position of motion information exported from the space domain motion information list in the candidate motion information list is in front of a position of motion information exported from a historical motion information list in the candidate motion information list;
  a position of motion information exported from the space domain motion information list in the candidate motion information list is behind a position of motion information exported from a historical motion information list in the candidate motion information list;
  motion information exported from the space domain motion information list is at a set position in the candidate motion information list; or
  when at least one position in the candidate motion information list does not include motion information, the motion information exported from the space domain motion information list is filled in the at least one position, where the motion information is sequentially filled in the at least one position according to a sequence in the space domain motion information list during filling; or motion information at a specified position in the space domain motion information list is filled in the at least one position.

In an exemplary embodiment, the list filling module 1020 is further configured to fill the candidate motion information list using preset motion information when the motion information in the candidate motion information list is insufficient.

In an exemplary embodiment, the list filling module 1020 is further configured to perform duplication checking and comparison on to-be-added motion information and motion information already existing in the candidate motion information list; and update the candidate motion information list according to a duplication checking and comparison result.

When the apparatus provided in the foregoing embodiments implements functions of the apparatus, the division of the foregoing functional modules is only an example for description. In an actual application, the functions may be assigned to and completed by different functional modules as required, that is, the internal structure of the device is divided into different functional modules, to implement all or some of the functions described above. In addition, the apparatus and method embodiments provided in the foregoing embodiments belong to one conception. For the specific implementation process, reference may be made to the method embodiments, and details are not described herein again.

Figure 11:
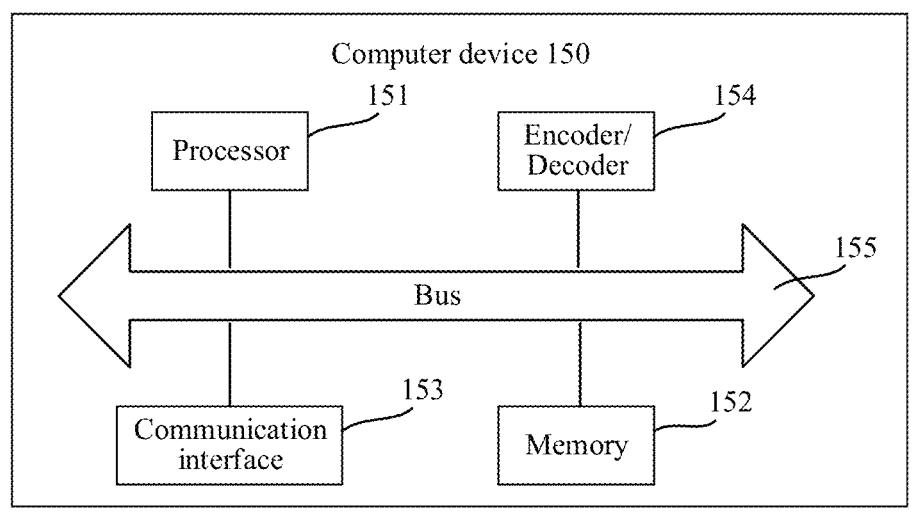
FIG. 11 is a structural block diagram of a computer device according to an embodiment of this application.

FIG. 11 is a schematic block diagram of a computer device according to an embodiment of this application. The computer device may be the encoder side device described above, or may be the decoder side device described above. The computer device 150 may include a processor 151, a memory 152, a communication interface 153, an encoder/decoder 154, and a bus 155.

The processor 151 includes one or more processing cores. The processor 151 runs a software program and a module to execute various functional applications and perform information processing.

The memory 152 may be configured to store a computer program. The processor 151 is configured to execute the computer program, to implement the foregoing method for constructing a motion information list in video encoding and decoding.

The communication interface 153 may be configured to communicate with other devices, for example, receiving/transmitting audio and video data.

The encoder/decoder 154 may be configured to implement encoding and decoding functions, for example, encoding and decoding audio and video data.

The memory 152 is connected to the processor 151 through the bus 155.

In addition, the memory 152 may be implemented by any type of volatile or non-volatile storage device or a combination thereof. The volatile or non-volatile storage device includes, but not limited to: a magnetic disk, an optical disc, an electrically erasable programmable read-only memory (EEPROM), an erasable programmable read-only memory (EPROM), a static random access memory (SRAM), a read-only memory (ROM), a magnetic memory, a flash memory, or a programmable read-only memory (PROM).

A person skilled in the art may understand that the structure shown in FIG. 11 does not constitute any limitation to the computer device 150, and the computer device may include more components or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing method for constructing a motion information list in video encoding and decoding.

In an exemplary embodiment, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions, to cause the computer device to execute the foregoing method for constructing a motion information list in video encoding and decoding.

It is to be understood that "plurality of" mentioned in this specification means two or more. "And/or" describes an association relationship for associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are only exemplary embodiments of this application, but are not intended to limit this application. Any modification, equivalent replacement, or improvement made without departing from the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for constructing a motion information list in video encoding and decoding, the method comprising:
    constructing a candidate motion information list for performing intra-frame prediction for a current block by filling the candidate motion information list using an intra-frame historical motion information prediction (IntraHMVP) list;
    determining that motion information in the candidate motion information list of the current block is insufficient after the construction;
    constructing a space domain motion information list for the current block, the space domain motion information list comprising motion information of a space domain neighboring block of the current block, and the space domain neighboring block comprising at least an intra string copy (ISC) block; and
    obtaining at least one piece of motion information from the space domain motion information list and filling the candidate motion information list using the at least one piece of motion information, wherein a position of the at least one piece of motion information exported from the space domain motion information list in the candidate motion information list is behind a position of any motion information exported from the IntraHMVP list in the candidate motion information list,
    the candidate motion information list being used for providing a candidate prediction displacement vector for the current block.

2. The method according to claim 1, wherein the ISC block comprises at least one of the following: a space domain adjacent ISC block or a space domain non-adjacent ISC block.

3. The method according to claim 1, wherein the space domain neighboring block further comprises at least one of the following: a space domain adjacent intra block copy (IBC) block or a space domain non-adjacent IBC block.

4. The method according to claim 1, wherein
    the candidate motion information list is used for providing a candidate block vector predictor (BVP) for an IBC block;
    or
    the candidate motion information list is used for providing a candidate string vector predictor (SVP) for an ISC string;
    or
    the candidate motion information list is used for providing a candidate BVP for an IBC block and providing a candidate SVP for an ISC string.

5. The method according to claim 1, wherein when the space domain neighboring block comprises an ISC block, motion information of the ISC block comprises at least one of the following:
    a string vector (SV) of a first encoding and decoding string in the ISC block according to a scanning sequence;
    an SV of a last encoding and decoding string in the ISC block according to a scanning sequence;
    a mean of an SV of a first encoding and decoding string and an SV of a last encoding and decoding string in the ISC block according to a scanning sequence;
    a weighted mean of an SV of a first encoding and decoding string and an SV of a last encoding and decoding string in the ISC block according to a scanning sequence; or
    SVs of a plurality of encoding and decoding strings in the ISC block.

6. The method according to claim 1, wherein the constructing a space domain motion information list for the current block comprises:
    detecting whether the current block comprises available motion information of a space domain adjacent block, wherein the space domain adjacent block comprises a space domain adjacent ISC block;
    obtaining and adding the available motion information of the space domain adjacent block to the space domain motion information list when the current block comprises the available motion information of the space domain adjacent block;
    detecting whether the current block comprises available motion information of a space domain non-adjacent block when the current block does not comprise the available motion information of the space domain adjacent block or the constructed space domain motion information list is not filled up, wherein the space domain non-adjacent block comprises at least one of a space domain non-adjacent ISC block or a space domain non-adjacent IBC block; and
    obtaining and adding the available motion information of the space domain non-adjacent block to the space domain motion information list when the current block comprises the available motion information of the space domain non-adjacent block.

7. The method according to claim 1, wherein the constructing a space domain motion information list for the current block comprises:
    traversing a plurality of position sets according to a preset sequence, wherein each of the position sets comprises a space domain adjacent block and a space domain non-adjacent block;

detecting, for each of the position sets, whether the space domain adjacent block comprised in the position set comprises available motion information;

obtaining and adding, when the space domain adjacent block comprises available motion information, the available motion information of the space domain adjacent block to the space domain motion information list;

detecting whether the space domain non-adjacent block comprised in the position set comprises available motion information when the space domain adjacent block does not comprise available motion information; and obtaining and adding, when the space domain non-adjacent block comprises available motion information, the available motion information of the space domain non-adjacent block to the space domain motion information list.

8. The method according to claim 1, wherein the constructing a space domain motion information list for the current block comprises:

detecting whether the current block comprises available motion information of a space domain non-adjacent block, wherein the space domain non-adjacent block comprises at least one of a space domain non-adjacent ISC block or a space domain non-adjacent IBC block;

obtaining and adding the available motion information of the space domain non-adjacent block to the space domain motion information list when the current block comprises the available motion information of the space domain non-adjacent block;

detecting whether the current block comprises available motion information of a space domain adjacent block when the current block does not comprise the available motion information of the space domain non-adjacent block or the constructed space domain motion information list is not filled up, wherein the space domain adjacent block comprises a space domain adjacent ISC block; and obtaining and adding the available motion information of the space domain adjacent block to the space domain motion information list when the current block comprises the available motion information of the space domain adjacent block.

9. The method according to claim 1, wherein the constructing a space domain motion information list for the current block comprises:

traversing a plurality of position sets according to a preset sequence, wherein each of the position sets comprises a space domain adjacent block and a space domain non-adjacent block;

detecting, for each of the position sets, whether the space domain non-adjacent block comprised in the position set comprises available motion information;

obtaining and adding, when the space domain non-adjacent block comprises available motion information, the available motion information of the space domain non-adjacent block to the space domain motion information list;

detecting whether the space domain adjacent block comprised in the position set comprises available motion information when the space domain non-adjacent block does not comprise available motion information; and obtaining and adding, when the space domain adjacent block comprises available motion information, the available motion information of the space domain adjacent block to the space domain motion information list.

10. The method according to claim 1, wherein the constructing a space domain motion information list for the current block comprises:

traversing a plurality of positions according to a preset sequence, wherein each of the positions comprises a space domain adjacent block;

detecting, for each of the positions, whether the space domain adjacent block of the position comprises available motion information; and obtaining and adding, when the space domain adjacent block comprises available motion information, the available motion information of the space domain adjacent block to the space domain motion information list.

11. The method according to claim 1, wherein the method further comprises:

filling the candidate motion information list using preset motion information when the motion information in the candidate motion information list is insufficient.

12. The method according to claim 11, wherein the filling the candidate motion information list using the at least one piece of motion information comprises:

performing duplication checking and comparison on to-be-added motion information and motion information already existing in the candidate motion information list; and updating the candidate motion information list according to a duplication checking and comparison result.

13. A computer device, comprising a processor and a memory, the memory storing at least one instruction, the at least one instruction being loaded and executed by the processor to cause the computer device to implement a method for constructing a motion information list in video encoding and decoding, the method comprising:

constructing a candidate motion information list for performing intra-frame prediction for a current block by filling the candidate motion information list using an intra-frame historical motion information prediction (IntraHMVP) list;

determining that motion information in the candidate motion information list of the current block is insufficient after the construction;

constructing a space domain motion information list for the current block, the space domain motion information list comprising motion information of a space domain neighboring block of the current block, and the space domain neighboring block comprising at least an intra string copy (ISC) block; and obtaining at least one piece of motion information from the space domain motion information list and filling the candidate motion information list using the at least one piece of motion information, wherein a position of the at least one piece of motion information exported from the space domain motion information list in the candidate motion information list is behind a position of any motion information exported from the IntraHMVP list in the candidate motion information list, the candidate motion information list being used for providing a candidate prediction displacement vector for the current block.

14. The computer device according to claim 13, wherein the ISC block comprises at least one of the following: a space domain adjacent ISC block or a space domain non-adjacent ISC block.

15. The computer device according to claim 13, wherein the space domain neighboring block further comprises at least one of the following: a space domain adjacent intra block copy (IBC) block or a space domain non-adjacent IBC block.

16. The computer device according to claim 13, wherein when the space domain neighboring block comprises an ISC block, motion information of the ISC block comprises at least one of the following:
- a string vector (SV) of a first encoding and decoding string in the ISC block according to a scanning sequence;
- an SV of a last encoding and decoding string in the ISC block according to a scanning sequence;
- a mean of an SV of a first encoding and decoding string and an SV of a last encoding and decoding string in the ISC block according to a scanning sequence;
- a weighted mean of an SV of a first encoding and decoding string and an SV of a last encoding and decoding string in the ISC block according to a scanning sequence; or
- SVs of a plurality of encoding and decoding strings in the ISC block.

17. The computer device according to claim 13, wherein the method further comprises:
- filling the candidate motion information list using preset motion information when the motion information in the candidate motion information list is insufficient.

18. The computer device according to claim 17, wherein the filling the candidate motion information list using the at least one piece of motion information comprises:
- performing duplication checking and comparison on to-be-added motion information and motion information already existing in the candidate motion information list; and
- updating the candidate motion information list according to a duplication checking and comparison result.

19. A non-transitory computer-readable storage medium, storing at least one instruction, the at least one instruction being loaded and executed by a processor of a computer device to cause the computer device to implement a method for constructing a motion information list in video encoding and decoding, the method comprising:
- constructing a candidate motion information list for performing intra-frame prediction for a current block by filling the candidate motion information list using an intra-frame historical motion information prediction (IntraHMVP) list;
- determining that motion information in the candidate motion information list of the current block is insufficient after the construction;
- constructing a space domain motion information list for the current block, the space domain motion information list comprising motion information of a space domain neighboring block of the current block, and the space domain neighboring block comprising at least an intra string copy (ISC) block; and
- obtaining at least one piece of motion information from the space domain motion information list and filling the candidate motion information list using the at least one piece of motion information, wherein a position of the at least one piece of motion information exported from the space domain motion information list in the candidate motion information list is behind a position of any motion information exported from the IntraHMVP list in the candidate motion information list,
- the candidate motion information list being used for providing a candidate prediction displacement vector for the current block.

* * * * *